United States Patent [19]

Morse et al.

[11] E Re. 30,177

[45] Reissued Dec. 25, 1979

[54] ANTI-SKID CONTROL DEVICE AND SYSTEM

[75] Inventors: Walter H. Morse, South Windsor; Ira R. Ames, Jr., Salisbury, both of Conn.

[73] Assignee: The Jacobs Manufacturing Company, West Hartford, Conn.

[21] Appl. No.: 923,468

[22] Filed: Jul. 10, 1978

Related U.S. Patent Documents

Reissue of:

[64] Patent No.: 3,969,003
Issued: Jul. 13, 1976
Appl. No.: 566,761
Filed: Apr. 10, 1975

U.S. Applications:

[62] Division of Ser. No. 431,952, Jan. 9, 1974, Pat. No. 3,908,805.

[51] Int. Cl.[2] ..... B60T 8/06
[52] U.S. Cl. ..... 303/113; 303/115
[58] Field of Search ..... 188/181 A, 181 R; 303/69, 102, 113–118

[56] References Cited

U.S. PATENT DOCUMENTS

| | | | |
|---|---|---|---|
| 2,772,904 | 12/1956 | Doolittle | 188/181 A X |
| 3,291,537 | 12/1966 | Wilson | 303/102 |
| 3,467,441 | 9/1969 | Clark et al. | 303/115 |
| 3,730,541 | 5/1973 | Bush et al. | 303/117 |
| 3,792,908 | 2/1974 | Brewster et al. | 303/113 |
| 3,853,357 | 12/1974 | Hitzelberger | 303/113 |

*Primary Examiner*—Duane A. Reger
*Attorney, Agent, or Firm*—Ronald A. Schapira

[57] ABSTRACT

A mechanical anti-wheel lock-up control system for avoiding wheel lock-up and consequent skidding in a motor vehicle, including a lock-up sensor or control device arranged in an open end of the axle tube and protectively covered over by the hub cap of the wheel, the control device being of an inertia flywheel actuable valve type controlling relief from and application of service air to the braking mechanism, the control device having an input shaft associated with the flywheel by means of an axially disengageable cam clutch and geared to be driven by the hub cap. The control device may be employed in a system individual to each wheel, or in a system serving a plurality or pair of wheels. In the latter, a control module of valves modulates the pressure of service air feeding to the braking mechanism in controlling a wheel lock-up condition.

67 Claims, 2 Drawing Figures

ANTI-SKID CONTROL DEVICE AND SYSTEM

Matter enclosed in heavy brackets [ ] appears in the original patent but forms no part of this reissue specification; matter printed in italics indicates the additions made by reissue.

BACKGROUND OF THE INVENTION

This application is a division of application Ser. No. 431,952, filed Jan. 9, 1974 *now U.S. Pat. No. 3,908,805.*

This invention is concerned with anti-wheel lock-up systems for controlling skidding of a motor vehicle equipped with air brakes.

Systems of this general nature are known from U.S. Pat. No. 3,046,060 and 3,447,838. In the first of these, a mechanical unit for sensing and controlling an imminent wheel lock-up condition is located partly within the brake drum of a related wheel whereby a crowded condition with the usual required elements therein is created. In the second of these patents, the sensing unit is located externally of the wheel where it is subject to the elements of weather and other hazards.

A general objective of the present invention is to improve upon these known systems by providing one having various features and advantages resulting therefrom which are not present in these known systems.

A feature of the system of the present invention is a miniature mechanical sensing unit or control device for controlling an imminent wheel lock-up condition in a vehicle, which unit is removably mounted in an open end of the axle tube supporting a related wheel, and which unit is protectively covered over by the hub cap of the wheel.

A very desirable advantage of this sensing unit arises from its location in the axle tube behind the hub cap, where it is guarded against attack by foreign particles or elements of the weather, is readily accessible for repairs or replacement, and does not occupy space usually required for an adequate accomodation of other elements.

A feature of the sensing unit is the manner in which it is operatively associated with the hub cap. This is of importance in that its arrangement does not require changes or modifications to be made in the brake drum of the related wheel, nor does it require components to be associated with the exterior of the wheel for its operation, as is required by the known devices mentioned.

Another feature of the present invention is a service air control module interconnecting a pair of sensing units with the braking mechanism of a pair of wheels for controlling the application to, and relief of service air from, the braking mechanisms when a wheel lock-up condition is imminent.

A desirable advantage of the module lies in its efficiency in controlling service air flow to the related braking mechanisms. It functions to maintain a minimum pressure of service air in the system in controlling an imminent wheel lock-up condition; it tends to lower system air pressure to match road conditions and aids in conserving air consumption. It further provides a plurality of cooperating valves in a single housing.

The foregoing, as well as other features, objectives, and advantages of this invention will appear more fully after considering the detailed description which follows in conjunction with the accompanying drawings wherein the invention is illustrated. It is to be expressly understood, however, that the drawings are for purposes of illustration and description, and accordingly they are not to be construed as defining the limits of the invention.

DESCRIPTION OF A FIRST SYSTEM EMBODYING THE INVENTION

Figure 1:
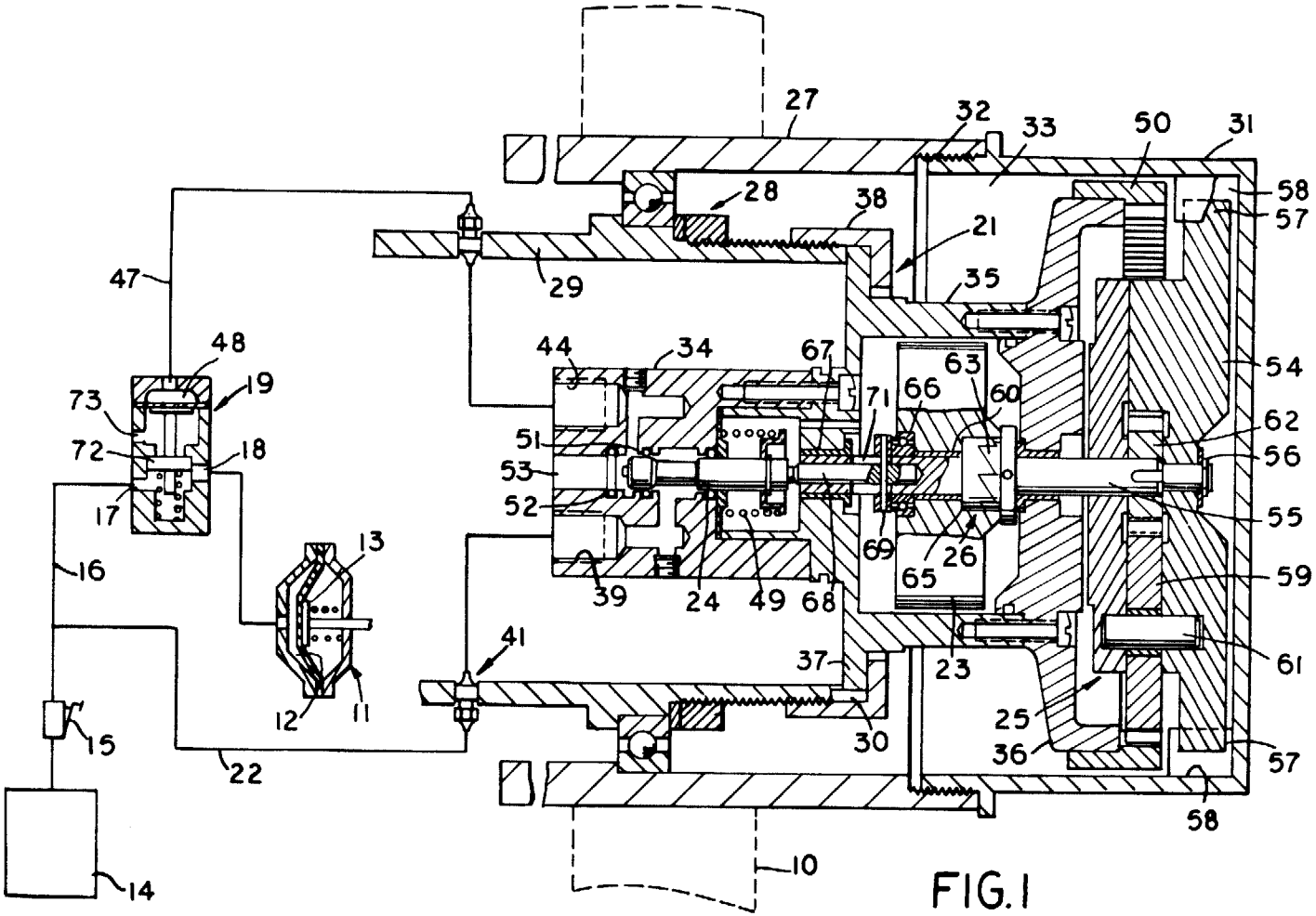
FIG. 1 is an illustration in schematic of a skid control system embodying the invention as applied to the braking mechanism of one of the wheels of a motor vehicle.

For a more detailed understanding of the invention, reference is directed to the drawings, but now especially to FIG. 1, wherein the invention is illustrated in a skid control system applied to an individual wheel 10 of a motor vehicle truck equipped with the usual air braking mechanism.

The braking mechanism includes the usual service air operable brake actuator 11 having a chamber 12 in which a diaphragm pilot 13 acts, when the chamber is pressurized, to cause application of the associated brakes in conventional manner to the wheel.

Flow of service air from the usual supply tank 14 is controlled by or subject to the will of the operator. For this purpose, a conventional pedal operable brake valve 15 is connected in the service air main line 16.

When the operator actuates the brake valve, service air flows over line 16 through normally communicating ports 17 and 18 of a service air relay 19 to pressurize the brake actuator 11, causing application of the usual associated brakes to the wheel 10. When the brake valve is released by the operator, the pressurized condition of the brake actuator is relieved back through the ports 17 and 18 and the service line 16 to the usual normally open vent in the brake valve. This is the action that occurs in a normal braking operation.

At other times, as when the wheel is rolling over a slippery road surface and the brakes are applied to it, the braking pressure may cause the wheel to rapidly decelerate relative to the velocity of the vehicle so as to make imminent a lock-up of the wheel with consequent skidding.

To avoid this occurrence, a wheel lock-up or skid sensing unit or control device 21 is associated with the wheel. It is connected downstream of the brake valve to a branch 22 of the service line. It functions automatically in response to development of an imminent lock-up condition in the wheel to control application to and relief of pressure air from the brake actuator 11, whereby the lock-up condition is avoided and the wheel is finally brought to a stop without undesirable skidding taking place.

The sensing unit or sensor 21 includes an inertia flywheel member 23 which has rotatable and axial movement relative to a slide valve 24, the latter being operable by the axial movement of the flywheel to control flow of service line air to the relay 19. Speed increasing planetary gearing 25 having a driven connection with the wheel 10, together with a cam tooth overriding clutch 26 functions to drive the flywheel.

The wheel 10 with which the sensor is operatively associated is mounted upon a hub 27 which is supported in conventional manner by suitable bearing and retaining means 28 on an axle tube 29 near an end of the latter. The axle tube is fixed in known manner to the chassis of the vehicle so as to be carried by the latter.

The axle tube is hollow and open at opposite ends. Each end of the axle tube is protectively covered over by a hub cap 31, the right end of the axle tube and the right hub cap being shown. The hub cap is threadedly connected at 32 to the mounting hub of the wheel. The hollow interior of the axle tube, together with a space or sealed chamber area 33 defined between the end of the axle tube and the hub cap, provides an ideal location for the sensor where it will be protectively sealed against foreign matter and where it will not interfere with other components of the vehicle.

To enable it to be accommodated in this advantageous but small area, the sensor has been miniaturized. It includes a group of sections 34, 35 and 36 which have been bolted to one another in end to end axial relation to define a housing for the sensor. The forward section 34 is of reduced diameter. It extends with a suitable clearance into the interior of the axle tube. The intermediate section 35 and the rear section 36, as well as the planetary gearing 25, are adequately accommodated in the chamber 33 provided by the interior of the hub cap.

The sensor is retained rigidly to the axle tube by means of a peripheral flange 37. The flange abuts the end wall of the axle tube and is rigidly clamped in position by means of a collar nut 38 threadedly engaging the axle tube. A key 30 engaged in registering slots of the flange and axle tube retains the sensor against rotation relative to the axle tube.

The sensor has an inlet passage 39 coupled by a fitting 41 through a radial hole in the axle tube with the branch service line 22. The sensor also has an outlet passage 44 similarly coupled by a fitting 41 through a radial hole in the axle tube with a line 47 connected to the diaphragm pilot chamber 48 of the relay valve 19.

The sensor valve 24 has a normal position under the bias of a return spring 49 closed upon a seat 51. In this condition, connection of the service inlet line 22 with the sensor outlet line 47 to the relay pilot chamber is blocked, and line 47 is connected through an opposite seat 52 in the sensor with a vent 53.

Shuttling or shifting of valve 24 back and forth between the seats 51 and 52 is controlled by the return spring 49 in conjunction with axial movements of the flywheel 23 in response to sudden deceleration and re-acceleration actions of the wheel 10 during a braking action.

The flywheel is operatively associated with the wheel 10 through the hub cap 31. To this end, a planetary drive cage 54 is mounted upon a drive or input shaft 55 for relative rotation and is retained thereon against endwise escape by a retaining clip 56. The planetary cage is drivably splined or engaged with the hub cap by means of a pair of peripheral lugs 57 engaged with a slide fit in internal slots 58 of the hub cap.

The drive cage carries idler gears 59 on pins 61, which gears (one being shown) drivingly engage a sun gear 62 keyed to the drive shaft 55 and also engage a ring gear 50 fixed to the housing section 36. Pinned upon the drive shaft is a drive clutch member 63 engaged by cam teeth with a driven clutch member 65. The latter is press fitted in a recess to the flywheel. Sleeve bearing 60 provides a slidable bearing support for the flywheel upon the shaft.

The shaft 55 extends beyond the flywheel and is supported at its free end for relative rotation in a bearing 67. A rod 68, slidably received in an axial recess of the shaft, carries a cross pin 69 which is extended through, and is axially movable in, a guide slot 71 formed in the shaft. The spring 49 which biases valve 24 upon the valve seat 51 also holds valve 24 constantly in abutment with the slide rod 68, pressing the latter into the shaft so that a slide collar carrying the cross pin 69 abuts the flywheel bearing 66.

In summary of the operation of the system: When the driver depresses the foot pedal to actuate the brake valve 15, service air flows over the main line 16 through the normally connected ports 17, 18 of the relay 19 to pressurize the pilot chamber 12 of the brake actuator 11 causing application of the brakes to the wheel 10. As long as the deceleration of the wheel and that of the vehicle are uniform, a normal braking action occurs to bring the wheel to a stop without accompanying skidding. In this normal braking action, the flywheel 23 remains engaged by the clutch 63, 65 with the drive shaft 55.

Now, if because slippery or bad road conditions occur, the pressure of the braking action on the wheel 10—while the brake valve is in actuated condition—should suddenly decelerate to create an imminent wheel lock-up condition, the sensor flywheel 23 will ride ahead of the drive shaft 55 and will be forced axially along the shaft in a clutch overriding action as the driven clutch member 65 is cammed axially out of engagement from the driving clutch member 63. The axially moving flywheel acts through the slide rod 68 to shift the valve 24 against the force of the return spring 49 from valve seat 51 to the opposed valve seat 52. This closes the vent 53 and connects the branch service line 22 with the sensor outlet line 47 to the diaphragm pilot chamber 48 of the relay. A signal of service line air then flows over the connected lines to pressurize the pilot diaphragm chamber to shift the relay valve 72 to an opposite position. The shifted valve blocks service air flow over main line 16 through the relay to the brake actuator 11, and causes the pressurized condition of the brake actuator to be relieved through the vent 73.

As the braking pressure is then relaxed, wheel 10 reaccelerates. Then, as the speed of the flywheel 23 and shaft 55 rematch, valve 24 and the flywheel are reshifted as a unit axially under the force of spring 49 to re-engage the clutch. If while the brake valve remains actuated, an imminent wheel lock-up condition continues, the action of the flywheel and shifting of the valve will be repeated. In effect, valve 24 will be rapidly oscillated from one condition by the shifting of the flywheel to the other until the wheel 10 is finally brought to a stop without accompanying skidding.

It is to be further noted here that the particular arrangement of the sensor 21 in the axle tube 29 and in the hub cap 31 has further advantages in that it allows ready access to the sensor for repair or replacement.

The ease with which the sensor 21 is adapted to be assembled to the axle tube is another advantage. In this respect, after the hub cap 31 has been unscrewed from the hub 27 of the wheel, the forward reduced section 34 of the sensor is entered into the open end of the axle tube until the flange 37 abuts the end shoulder of the axle tube. The sensor is then adjustably rotated as needed to register the key 30 with its slot. The collar nut 38 is then drawn tight to clamp the sensor rigidly in place. The slots 58 in the hub cap 31 are then registered to partially receive the lugs or splines 57 of the planetary drive cage 54. The lugs are then fully received into the slots as the hub cap is threadedly drawn tight upon the hub 27.

The system disclosed in FIG. 1 represents a simple embodiment of the invention in which a separate sensor unit or control device 21 and a relay 19 are individual to the braking mechanism of each wheel 10 to which the system is applied. It is understandable that when a separate sensor unit is associated with each end of the axle tube, the slope of the cam teeth of the clutch members 63, 65 of the sensor at one end of the axle tube will be inclined reversely to those of the other sensor to obtain the necessary overriding declutching action of the clutch.

FIG. 2 EMBODIMENT

Figure 2:
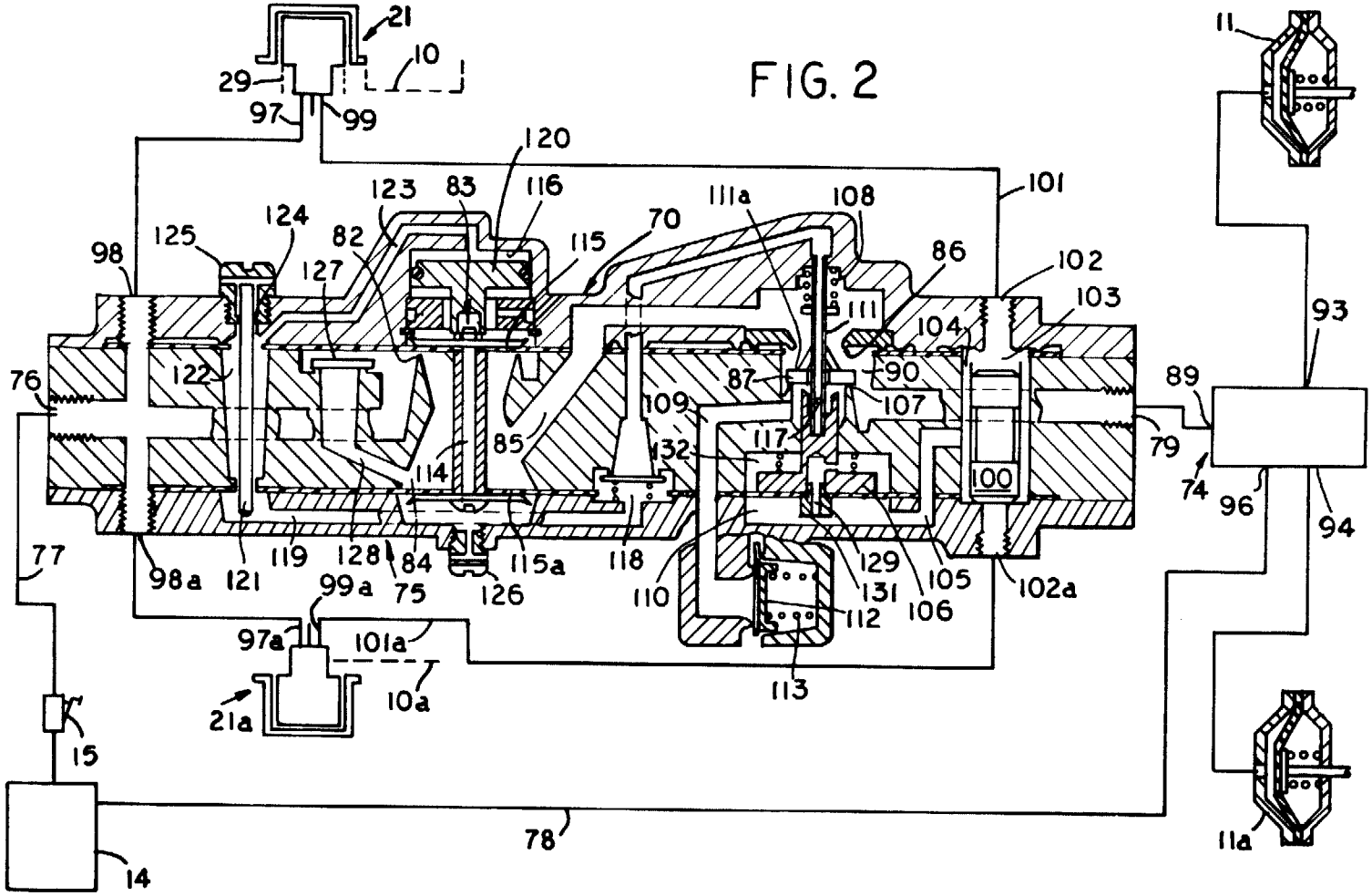
FIG. 2 is an illustration in schematic of a further skid control system embodying the invention in which a pair of skid sensing units together with the service air control module are integrated and applied to the braking mechanisms of a pair of wheels of the vehicle.

The system disclosed in FIG. 2 is shown as being applied to the braking mechanisms of the wheels 10 and 10a mounted to opposite ends of the axle tube 29 so as to avoid an imminent wheel lock-up condition in either wheel and consequent skidding. To this end, the system includes a pair of sensors or control devices 21 and 21a, one mounted (in the manner earlier described) to each end of the axle tube, the sensors being the same as that shown in FIG. 1. A conventional relay valve 74 is common to and serves the right and left brake actuators 11 and 11a for the braking mechanism of both wheels, and module 75 of interconnected valves connected with both sensors controls application of service air to the one relay 74.

The module 75 includes a general housing 70 having an air inlet passage 76 connected to a branch 77 beyond the brake valve 15. The housing has an outlet passage 79 connected with the relay valve 74.

In a braking operation, the driver of the vehicle depresses the usual foot pedal to actuate the brake valve 15 causing the service air from tank 14 to flow to the inlet passage 76 of the module. From the inlet, the air flows through a normally open seat 82 of a pressure reducing valve 83 into a chamber 84 of the latter. It passes from the latter into a passage 85 from which it flows through a normally open seat 86 of a quick-acting valve 87 into the outlet passage 79 leading to a control air inlet 89 to the relay valve 74.

The service air from port 79 applied to the relay valve 74 causes air to be applied to the brake chambers 11, 11a in a conventional manner through lines 93 and 94. The relay valve 74 supply port 96 is connected with air line 78 which is fed from reservoir 14.

Air then flows over the line 78 through the relay to pressurize both brake actuators, causing the related brakes to be applied to the right and left wheels 10 and 10a. Under normal road conditions, the wheels are decelerated in this action to a stop without accompanying skidding.

When the brake valve is subsequently released, the pressurized condition of the relay valve 74 is relaxed back through the passages of the module and through the usual vent in the brake valve 15. This interrupts the flow of air through line 78 and causes the relay valve to exhaust air from line 94 and 93 and from chambers 11 and 11a in a conventional manner. The braking action on the wheels is then relaxed as the diaphragms of the brake actuators are restored by their springs. This is the manner in which a normal braking action occurs in the FIG. 2 system.

Now, if an imminent wheel lock-up condition should develop in one or both wheels 10, 10a while the associated brakes are being applied, one or the other or both sensors 21, 21a are adapted to respond to control the braking action of the wheels so as to avoid the lock-up condition and consequent skidding. To this end, the service air inlet 97 to the right wheel sensor 21 is connected with a passage 98 in the module branching off the main inlet passage 76; and the outlet 99 of the right wheel sensor is connected by a line 101 with a port 102 that opens into one end of a shuttle valve chamber 103 in the module. The inlet 97a to the left wheel sensor is similarly connected with a branch 98a of the inlet passage 76 of the module, and its outlet 99a is similarly connected by a line 101a with a port 102a opening into the opposite end of the shuttle valve chamber. The shuttle valve chamber 103 connects by grooves 104 in its wall with a passage 105 leading to the underside area of a diaphragm actuable piston 106. The latter controls shifting action of the quick-acting valve 87 relative to opposed seats 86 and 107 the valve 87 is operable in an enlarged area 90 formed intermediately of the ends of passage 85.

The quick-acting valve is normally biased by a return spring 108 upon seat 107 so as to block the outlet passage 79 in the module from a vent passage 109, and to connect it through the opposed open seat 86 with the passage 85.

When one or the other of the sensors in this FIG. 2 system responds to an imminent lock-up condition of its associated wheel during a braking operation, its valve is shifted by the related flywheel, as earlier explained with respect to FIG. 1, to connect the pilot and outlet ports 39, 44. This causes a signal of service air to flow to the corresponding end of the shuttle valve chamber 103. The signal will (if received from only one of the sensors) shift the shuttle valve 100 closed over the opposite entry port if it is not already there so as to prevent the signal from being lost through the vent connected line of the other sensor. The signal will then flow through the grooves 104 of the chamber and the connecting passage 105 to pressurize the chamber 110 beneath the pilot piston 106.

If signals from both sensors enter the shuttle valve chamber, the shuttle valve will become pneumatically balanced between the ends of its chamber and allow both signals to pass to the chamber 110 beneath the pilot piston 106. Since the vents 53 in both sensors will be closed by the respective sensor valves in the latter situation, neither signal will be lost.

Upon being pressurized by the sensor signal, the pilot piston moves against an end of a hollow stem 111 loosely extending through the quick-acting valve 87. In this action, the stem is moved against the bias of its return spring 108 to allow the piston to shift the quick-acting valve closed onto the opposed seat 86 so as to interrupt flow of service air through the module to the pilot chamber of relay 74 and to connect the latter with the vent passage 109 through the module. With this action, the pressurized condition of the relay 74 is relaxed through port 79 to the vent passage 109 and past a minimum pressure check valve 112 to atmosphere.

The check valve 112 is designed to allow, according to the tension of its return spring 113, a predetermined minimum pressure to remain in the relay 74, which would be a little more than that required to overcome the spring of brake actuators 11, 11a but not enough to effectively apply the brakes. This will be understood by those working in the art.

As the relay valve restores, the connected brake actuators 11, 11a also restore to relax the braking pressure being applied to the corresponding wheels, thus avoiding the threatened lock-up condition. The affected sensor also restores as the acceleration of the related wheel now increases, and the pressurized condition of the chamber 110 beneath the pilot piston 106 of the quick-acting valve is relieved back through the shuttle valve and connections through the related sensor to the sensor vent. This causes the spring 108 to reshift the quick-acting valve back over seat 107.

Since the brake pedal continues to be depressed and the wheels are still rolling, flow of service air through the module to pressurize the relay resumes and a braking action re-occurs. If a wheel lock-up condition continues to be sensed, the affected wheel sensor responds as before. The resumption of braking action and interruption of such action continues repeatedly. In this action, the affected sensor valve rapidly oscillates from one condition to the other as a wheel lock-up condition is alternately dissipated and reinstated. The oscillation ends as the vehicle is finally braked to a stop.

The minimum pressure check valve 112 is of advantage in that it functions to maintain a minimum pressure to the relay 74 during the period a sensor is functioning to avoid a lock-up condition. This arrangement is of particular advantage in that it conserves air that would otherwise be wasted were the brake actuator to be repeatedly completely emptied and refilled during a braking action. It accordingly also promotes swift action in applying the brakes.

The pressure reducing valve 83 is incorporated into the module to reduce the maximum service line air pressure passing to the relay 74 after the initial response of a sensor, so that during the repeated action of the sensor to control an imminent wheel lock-up condition, the maximum pressure of the service air passing to the relay will be limited at the brake actuators. This acts to throttle the air to brake actuators which allows the brakes to respond more quickly to the sensor signals.

The pressure reducing valve 83 is of a floating spool diaphragm actuable type. It includes a stem 114 extending freely through its chamber 84 and suspended therein by means of diaphragms 115, 115a fastened one to each end of the stem and sandwiched in the housing of the module. A piston 120 in the chamber 116 above the diaphragm end 115 provides a surface area that is subject to biasing pressures developing in chamber 116 to restrict the valve seat opening 82 and thereby reduce the pressure of service air passing from the inlet passage 76 through the valve chamber 84 to the passage 85 leading eventually through the outlet passage 79 to the relay 74.

Chamber 116 is supplied with biasing pressure air when the quick-acting valve 87 has been transferred from seat 107 to seat 86 by movement of piston 106. Movement of piston 106 carries stem 111 opening seat 111a. When the latter action occurs, air in passage 85 passes around stem 111 in valve 87 and enters a radial port 117 to the hollow stem 111 and escapes through a check valve 118 to a passage 119 that bleeds around a loosely fitting end of a pin 121 to an accumulating chamber 122. The latter connects as its opposite end by a passage 123 with chamber 116. The biasing air pressure develops in the latter chamber to the extent permitted by bleed clearance 124 in plug 125. Vents 124 in plug 125 connect with passage 123. The area below the opposite diaphragm 115a is also provided with a bleed plug 126 to maintain this area vented.

It can be seen that the pressure developing in chamber 116 over the end of the pressure reducing valve will be progressive according to the duration of the "on-and-off" braking action that is required to finally bring an affected wheel to a stop without incurring a wheel lock-up condition.

It is understandable that after the operator releases the brake valve 15, the pressure of air in the system will be relieved through the various vents.

Further, after the brake valve is released, a quick-acting venting valve 127 seated over a passage 128 connected to the pressure reducing valve chamber 84 functions to rapidly relieve pressure air from the module system back through the inlet passage 76 to the usual vent in the brake valve. Passage 128 by-passes the restricted seat opening 82 of the pressure reducing valve. The quick-venting valve functions only when the brake valve 15 is released since at other times it is pneumatically unbalanced in a closed condition over the by-pass 128.

As earlier mentioned, when a sensor responds to an imminent wheel lock-up condition, its valve is shifted and a service line pressure air signal is fed to the shuttle valve chamber of the module to cause the quick-acting valve 87 to interrupt service line air flow to the relay 74 and thereby cause the braking action on the wheels to be relaxed. It is understandable that if the valve of a responding sensor (FIG. 1) were to be stuck for some reason in its shifted open position, normal braking acton would be disabled. To avoid this result, means is provided which will in such event cause the quick-acting valve 87 to reopen the service air flow passage 76, 85, 79 through the module to the relay 74 to maintain normal braking action.

This means includes a bleed hole 129 provided through a bleed screw 131 in the pilot piston. The bleed hole connects the chamber 110 at the underside of the diaphragm piston 106 with a chamber 132 at the upper side. By this means, air pressure building up at the upper side 132 together with the supplemental aid of the return spring 108 will force the quick-acting valve 87 to its normal position over seat 107 allowing feed of service air to the relay to be received for normal braking operations. During normal conditions, as when a valve in a sensor is not stuck in an open condition, the shifting of the quick-acting valve 87 from one valve seat to the other in avoiding a wheel lock-up condition is so rapid that any bleed air escaping to the upper chamber 132 is quickly vented back through the shuttle valve chamber and the vent of the affected sensor.

While an embodiment of the invention has been illustrated and described in detail herein, it is to be expressly understood that the invention is not limited thereto. Various changes can be made in the design and arrangement of the parts of the embodiment without departing from the spirit and scope of the invention as the same will now be understood by those skilled in the art; it is our intent, therefore, to claim the invention not only as shown and described herein but also in all such forms and modifications as may reasonably be construed to fall within the spirit of the invention and the scope of the appended claims.

We claim:

1. A brake service air module comprising a unitary housing having a main inlet connectible with a brake service air source, a main outlet connectible with an air operable braking mechanism, a flow passage through the housing normally communicating the main inlet with the main outlet, an air signal outlet from the housing branching off the flow passage adjacent the main inlet connectible with an air inlet of a wheel lock-up air signal transmitting control device, quick acting valve means in the housing having response upon application to it of an air signal to interrupt communication of the flow passage with the main outlet and to connect the main outlet with a vent passage, an air signal admission port to the housing adjacent the main outlet connectible with an air signal outlet of the control device, the admission port being connected in the housing for application of an admitted air signal to the quick acting valve means.

2. A brake service air module as in claim 1, wherein means is provided having response to a predetermined time interruption of the communication of the flow passage by the quick-acting valve to restore communication of the flow passage with the main outlet.

3. A brake service air module as in claim 1, including in the housing a pressure reducing valve connected in the flow passage having a normal condition allowing free flow of service air from the inlet through the flow passage, and passage means connected with the vent passage for communicating pressure air from the vent passage to bias the pressure reducing valve toward its seat so as to restrict flow through the flow passage.

4. A brake service air module as in claim 3, including in the housing a quick-venting valve normally blocking a by-pass connection from the flow passage around the pressure reducing valve to the main inlet and having response to relaxing of pressure of service air in the main outlet to open the by-pass connection.

5. The combination comprising a motor vehicle brake air service tank (14), a pair of air operable brake actuators (11, 11a) each individual to a wheel (10, 10a) of the vehicle, an air operable relay valve (74) having an air supply inlet (96) connected with a branch line (78) from the tank and having a separate brake feed outlet (93, 94) connected with each brake actuator, the relay valve having a normal condition closing the supply inlet to both of the brake feed outlets and venting the latter, a control air inlet (89) for admitting air to the relay valve for pressurizing the latter to an open condition communicating the branch line (78) with both brake feed outlets, a separate anti-wheel lock-up control device (21, 21a) operatively associated with each of said wheels, a module (75) having a housing (70) provided with a main inlet (76) connected with a second branch line (77) from the tank and provided with a main outlet (79) connected with the control air inlet to the relay valve, the module having a main passage (85) therein normally communicating the main inlet with the main outlet, an air brake valve (15) in the second branch line operable to cause flow of air from the tank through the main passage to the control air inlet of the relay valve to pressurize the latter to open condition, a separate secondary outlet (98, 98a) from the module connecting the main passage with an air signal inlet (97, 97a) to a separate one of the control devices, each control device having an air signal outlet (99, 99a) connected to a separate air signal admission port (102, 102a) in the module, each control device having a normal condition blocking flow of air signal from the air signal inlet (97, 97a) to the air signal outlet (99, 99a), each control device being responsive independently of the other to an imminent lock-up condition of its related wheel to communicate its air signal inlet with its air signal outlet so as to allow passing of an air signal from the tank through the control device to the corresponding air signal admission port, and valve means (100, 87) within the module having response to an air signal admitted through either or both of the air signal admission ports to block the main passage (85) to flow of air from the tank over the second branch line (77) to the relay valve (74) and simultaneously therewith to communicate the control air inlet (97) of the relay valve to a vent passage (109).

6. The combination as in claim 5, wherein the valve means (100, 87) includes a quick acting valve (87) controlling opening and closing of both the main passage (85) and the vent passage (109) to the control inlet (97) of the relay valve (74) and having a normal condition in which it is open relative to the main passage and closed relative to the vent passage.

7. The combination as in claim 6, wherein the quick acting valve (87) is disposed in an enlarged portion (90) of the main passage (85) between a pair of opposed first and second valve seats (86) and (107), the first valve seat (86) communicating a section of the main passage located upstream of the enlarged portion (90) with a section of the main passage located downstream of said enlarged portion, the second valve seat (107) communicating the downstream section of the main passage with the vent passage (109), and the quick acting valve having a normal condition under a spring load (108) seated upon the second valve seat.

8. The combination as in claim 7, wherein the quick acting valve (87) is movable from the second valve seat (107) to the first valve seat (86) by means of a diaphragm piston portion (106) of the quick acting valve upon application to it of an air signal admitted through either or both of the air signal admission ports (102, 102a), and the valve means (100, 87) includes a shuttle valve (100) controlling application of the admitted air signal to the diaphragm piston portion.

9. The combination as in claim 8, wherein the air signal admission ports (102, 102a) communicate axially with opposite ends of a shuttle valve chamber (103), a signal passage (105) communicates an intermediate area of the shuttle valve chamber with a pressure chamber (110) below the diaphragm piston (106), the shuttle valve is shiftable from a position seated over one of the admission ports (102), or (102a) to a position seated over the other or to a position in unseated relation between both admission ports accordingly as air signals are admitted to one or the other of the admission ports or to both admission ports, and passage means (104) is provided in the shuttle valve chamber for communicating the admitted signals around the shuttle valve and signal passage (105) to pressurization chamber (110) below the diaphragm piston.

10. The combination as in claim 6, wherein the valve means (100, 87), includes a check valve (112) under a predetermined spring load (113) controlling the venting of the vent passage (109), the check valve being operable to allow escape of air from the vent passage accordingly as the pressure of the air in the vent passage exceeds the spring load on the check valve.

11. The combination as in claim 10, wherein safety means is provided for releasing the quick acting valve (87) from a seated position over the first valve seat (86) following a predetermined time period, the safety means comprising a pressurization chamber (132) above the diaphragm piston (106), and a bleed passage (129) communicating the latter chamber with the pressurization (110) below the diaphragm piston.

*12. In a brake service air module (75), having a main inlet (76) connectible with a brake service air source (14), a main outlet (79) connectible with an air operable braking mechanism (11), a main flow passage (85) connecting the main inlet (76) and the main outlet (79), and valve means responsive to the application of an air signal to prevent communication of the main inlet (76) with the main outlet (79) through the main flow passage (85); the improved valve means comprising:*

*a valve (87) movable within the main flow passage (85) between a first position, wherein communication is established between the main inlet (76) and the main outlet (79), and a second position, wherein such communication is prevented by the valve (87);*

*a signal passage (105), connected to a source (21) of an air signal and having an outlet adjacent to the first position of the valve (87) and remote from the second position of the valve (87);*

*a diaphragm connected to the outlet of the signal passage (105); the diaphragm being adapted to move away from the outlet of the signal passage (105) and towards the first position of the valve (87) in response to an air signal of the source (21) in the signal passage (105); and*

*means (106) connected to the diaphragm for moving the valve (87) from its first position to its second position in the main flow passage (85) in response to movement of the diaphragm away from the outlet of the signal passage (105) and towards the first position of the valve (87).*

*13. A brake service air module as in claim 12 wherein the valve (87) is disposed in an enlarged portion (90) of the main flow passage (85) and wherein the valve (87) is movable between a pair of opposed, first and second, valve seats (107 and 86) within the enlarged portion (90) of the main flow passage 85; the first valve seat (107) being downstream of the valve (87), so that when the valve (87) is in its first position, the valve is seated against the first valve seat (107) and communication between the main inlet (76) and the main outlet (79) along the main flow passage (85) is established; and the second valve seat (86) being upstream of the valve (87), so that when the valve (87) is in its second position, the valve is seated against the second valve seat (86) and communication between the main inlet (76) and the main outlet (79) along the main flow passage (85) is prevented by the valve.*

*14. A brake service air module as in claim 13 which includes means (108) for biassing the valve (87) away from its second valve seat (86) and towards its first valve seat (107) to establish communication along the main flow passage (85).*

*15. A brake service air module as in claim 12 wherein the means connected to the diaphragm for moving the valve (87) from its first position to its second position comprises:*

*a pilot piston (106) connected to and extending through the diaphragm and positioned between the outlet of the signal passage (105) and the first position of the valve (87); and*

*a chamber (132) between the outlet of the signal passage (105) and the first position of the valve (87);*

*the pilot piston (106) being provided within the chamber (132) and being adapted to move within the chamber (132) away from the outlet of the signal passage (105) and towards the first position of the valve (87) in response to movement of the diaphragm away from the outlet of the signal passage (105) and towards the first position of the valve (87); the pilot piston (106) also being provided with a bleed hole (129) connecting the chamber (132) with the outlet of the signal passage (105); and*

*means connected to the pilot piston (106) for moving the valve (87) from its first position to its second position in the main flow passage (85) in response to movement of the pilot piston (106) within the chamber (132) away from the outlet of the signal passage (105) and towards the first position of the valve (87).*

*16. A brake service air module as in claim 15 wherein the diaphragm is adapted to move within the chamber (132) away from the outlet of the signal passage (105) and towards the first position of the valve (87) in response to an air signal of the source (21) in the signal passage (105).*

*17. A brake service air module as in claim 15 wherein the bleed hole (129) connects the outlet of the signal passage (105) with portions of the chamber (132) between the pilot piston (106) and the first position of the valve (87).*

*18. A brake service air module as in claim 15 wherein the means connected to the pilot piston (106) for moving the valve (87) comprises means that extends from the pilot piston (106) towards the valve (87) and its second position and that is adapted to move to a position between the first and second positions of the valve (87) and thereby to move the valve (87) from its first position to its second position in response to movement of the pilot piston (106) within the chamber (132) away from the outlet of the signal passage (105) and towards the first position of the valve (87).*

*19. A brake service air module as in claim 15 which includes means in the chamber (132) for biassing the pilot piston (106) towards the outlet of the signal passage (105) and away from the first position of the valve (87).*

*20. A brake service air module as in claim 19 which includes means (108) for biassing the valve (87) towards its first position and away from its second position.*

*21. In a brake service air module (75), having a main inlet (76) connectible with a brake service air source (14), a main outlet (79) connectible with an air operable braking mechanism (11), a main flow passage (85) connecting the main inlet (76) and the main outlet (79), and valve means responsive to the application of an air signal to prevent communication of the main inlet (76) with the main outlet (79) through the main flow passage (85); the improved valve means comprising:*

*a valve (87) movable within the main flow passage (85) between a first position, wherein communication is established between the main inlet (76) and the main outlet (79), and a second position, wherein such communication is prevented by the valve (87);*

*a signal passage (105), connected to a source (21) of an air signal and having an outlet adjacent to the first position of the valve (87) and remote from the second position of the valve (87);*

*a pilot piston (106) positioned between the outlet of the signal passage (105) and the first position of the valve (87);*

*a chamber (132) between the outlet of the signal passage (105) and the first position of the valve (87); the pilot piston (106) being provided within the chamber (132) and being adapted to move within the chamber (132) between the outlet of the signal passage (105) and the first position of the valve (87);*

*means for moving the pilot piston (106) away from the outlet of the signal passage (105) and towards the first*

*position of the valve (87) in response to an air signal of the source (21) in the signal passage (105); and*

*means connected to the pilot piston (106) for moving the valve (87) from its first position to its second position in the main flow passage (85) in response to movement of the pilot piston (106) within the chamber (132) away from the outlet of the signal passage (105) and towards the first position of the valve (87).*

*22. A brake service air module as in claim 21 wherein the pilot piston (106) is provided with a bleed hole (129) connecting the outlet of the signal passage (105) with portions of the chamber (132) between the pilot piston (106) and the first position of the valve (87).*

*23. A brake service air module as in claim 21 wherein the means connected to the pilot piston (106) for moving the valve (87) comprises means that extends from the pilot piston (106) towards the valve (87) and its second position and that is adapted to move to a position between the first and second positions of the valve (87) and thereby to move the valve (87) from its first position to its second position in response to movement of the pilot piston (106) within the chamber (132) away from the outlet of the signal passage (105) and towards the first position of the valve (87).*

*24. A brake service air module as in claim 21 which includes means in the chamber (132) for biassing the pilot piston (106) towards the outlet of the signal passage (105) and away from the first position of the valve (87).*

*25. A brake service air module as in claim 21 which includes means (108) for biassing the valve (87) towards its first position and away from its second position.*

*26. In a brake service air module (75), having a main inlet (76) connectible with a brake service air source (14), a main outlet (79) connectible with an air operable braking mechanism (11), a main flow passage (85) connecting the main inlet (76) and the main outlet (79), and valve means responsive to the application of an air signal to prevent communication of the main inlet (76) with the main outlet (79) through the main flow passage (85); the improved valve means comprising:*

*a valve (87) movable within the main flow passage (85) between a first position, wherein communication is established between the main inlet (76) and the main outlet (79), and a second position, wherein such communication is prevented by the valve (87);*

*a first source (21) of an air signal;*

*a chamber (103), a first end (102) of which is connected to an outlet of the first source (21) of an air signal;*

*a signal passage (105) connected to the chamber (103) and having an outlet adjacent to the first position of the valve (87) and remote from the second position of the valve (87);*

*a shuttle valve (100) within the chamber (103) which can move against the first end (102) of the chamber (103), to close the outlet of the first source (21) of an air signal, and which can also move away from the first end (102) of the chamber (103) in response to an air signal of the first source (21), to open the outlet of the first source (21) of an air signal, so that in the event of an air signal by the first source (21), communication is established between the first source (21) of an air signal and the signal passage (105) through the chamber (103); and*

*means (106), located between the valve (87) and the outlet of the signal passage (105), for moving the valve (87) from its first position to its second position in the main flow passage (85) in response to an air signal in the signal passage (105).*

*27. A brake service air module as in claim 26 wherein the chamber (103) includes means (21a) for biassing the shuttle valve (100) against the first end (102) of the chamber (103).*

*28. A brake service air module as in claim 27 wherein the means for biassing the shuttle valve (100) against the first end (102) of the chamber (103) comprises a second source (21a) of an air signal, having an outlet connected to a second end (102a) of the chamber (103), which is axially opposite the first end (102) of the chamber (103).*

*29. A brake service air module as in claim 28 wherein the signal passage (105) is connected to the chamber (103) and to the first and second sources (21 and 21a) of an air signal by means of grooves (104) in the wall of the chamber (103) between the first and second ends (102 and 102a) of the chamber (103).*

*30. A brake service air module as in claim 28 wherein the means (106) for moving the valve (87) from its first position to its second position comprises:*

*a diaphragm connected to the outlet of the signal passage (105) and adapted to move away from the outlet of the signal passage (105) and towards the first position of the valve (87) in response to an air signal of the first or second source (21 or 21a) in the signal passage (105); and*

*means (106) connected to the diaphragm for moving the valve (87) from its first position to its second position in the main flow passage (85) in response to movement of the diaphragm away from the outlet of the signal passage (105) and towards the first position of the valve (87).*

*31. A brake service air module as in claim 30 wherein the means (106) connected to the diaphragm for moving the valve (87) from its first position to its second position comprises:*

*a pilot piston (106) connected to and extending through the diaphragm and positioned between the outlet of the signal passage (105) and the first position of the valve (87);*

*a second chamber (132) between the outlet of the signal passage (105) and the first position of the valve (87);*

*the pilot piston (106) being provided within the second chamber (132) and being adapted to move within the second chamber (132) towards the first position of the valve (87) and away from the outlet of the signal passage (105) in response to movement of the diaphragm away from the outlet of the signal passage (105) and towards the first position of the valve (87); the pilot piston (106) also being provided with a bleed hole (129) connecting the second chamber (132) with the outlet of the signal passage (105); and*

*means connected to the pilot piston (106) for moving the valve (87) from its first position to its second position in the main flow passage (85) in response to movement of the pilot piston (106) within the second chamber (132) away from the outlet of the signal passage (105) and towards the first position of the valve (87).*

*32. A brake service air module as in claim 31 wherein the means connected to the pilot piston (106) for moving the valve (87) comprises means that extends from the pilot piston (106) towards the valve (87) and its second position and that is adapted to move to a position between the first and second positions of the valve (87) and thereby to move the valve (87) from its first position to its second position in response to movement of the pilot piston (106) within the second chamber (132) away from the outlet of the signal passage (105) and towards the first position of the valve (87).*

*33. A brake service air module as in claim 31 which includes means in the second chamber (132) for biassing the pilot piston (106) towards the outlet of the signal passage (105) and away from the first position of the valve (87).*

*34. A brake service air module as in claim 28 wherein the means (106) for moving the valve (87) from its first position to its second position comprises:*

*a pilot piston (106) positioned between the outlet of the signal passage (105) and the first position of the valve (87);*

*a second chamber (132) between the outlet of the signal passage (105) and the first position of the valve (87); the pilot piston (106) being provided within the chamber (132) and being adapted to move within the chamber (132) between the outlet of the signal passage (105) and the first position of the valve (87);*

*means for moving the pilot piston (106) away from the outlet of the signal passage (105) and towards the first position of the valve (87) in response to an air signal of the first or second source (21 or 21a) in the signal passage (105); and*

*means connected to the pilot piston (106) for moving the valve (87) from its first position to its second position in the main flow passage (85) in response to movement of the pilot piston (106) within the second chamber (132) away from the outlet of the signal passage (105) and towards the first position of the valve (87).*

*35. A brake service air module as in claim 34 wherein the pilot piston (106) is provided with a bleed hole (129) connecting the outlet of the signal passage (105) with portions of the second chamber (132) between the pilot piston (106) and the first position of the valve (87).*

*36. In a brake service air module (75), having a main inlet (76) connectible with a brake service air source (14), a main outlet (79) connectible with an air operable braking mechanism (11), a main flow passage (85) connecting the main inlet (76) and the main outlet (79), and valve means responsive to the application of an air signal to prevent communication of the main inlet (76) with the main outlet (79) through the main flow passage (85); the improved valve means comprising:*

*a valve (87) movable within the main flow passage (85) between a first position, wherein communication is established between the main inlet (76) and the main outlet (79), and a second position, wherein such communication is prevented by the valve (87); the valve (87) being disposed in an enlarged portion (90) of the main flow passage (85) and being movable between a pair of opposed, first and second, valve seats (107 and 86) within the enlarged portion (90) of the main flow passage (85); the first valve seat (107) being downstream of the valve (87), so that when the valve (87) is in its first position, the valve is seated against the first valve seat (107) and communication between the main inlet (76) and the main outlet (79) along the main flow passage (85) is established; and the second valve seat (86) being upstream of the valve (87), so that when the valve (87) is in its second position, the valve is seated against the second valve seat (86) and communication between the main inlet (76) and the main outlet (79) along the main flow passage (85) is prevented by the valve (87); and*

*a vent passage (109), a first end of which is connected to the enlarged portion (90) of the main flow passage (85) and is located downstream of the first valve seat (107), so that when the valve (87) is seated against the first valve seat (107), communication between the vent passage (109) and the main inlet and outlet (76 and 79) is prevented by the valve (87) and so that when the valve (87) is seated against the second valve seat (86), communication between the vent passage (109) and the main outlet (79) is established but communication between the main inlet (76) and the vent passage (109) is prevented by the valve (87).*

*37. A brake service air module as in claim 36 wherein a check valve (112) is connected to a second end of the vent passage (109); the check valve (112) being provided with means (113) biassing the check valve (112) closed, to restrict communication between the second end of the vent passage (109) and the atmosphere.*

*38. A brake service air module as in claim 36 wherein the first end of the vent passage (109) is connected to the enlarged portion (90) of the main flow passage (85) within the first valve seat (107).*

*39. In a brake service air module (75), having a main inlet (76) connectible with a brake service air source (14), a main outlet (79) connectible with an air operable breaking mechanism (11), a main flow passage (85) connecting the main inlet (76) and the main outlet (79), and valve means responsive to the application of an air signal to prevent communication of the main inlet (76) with the main outlet (79) through the main flow passage (85); the improved valve means comprising:*

*a valve (87) movable within the main flow passage (85) between a first position, wherein communication is established between the main inlet (76) and the main outlet (79), and a second position, wherein such communication is prevented by the valve (87);*

*a second passage (119) having an outlet located adjacent the main flow passage (85);*

*means (111 and 111a) for increasing the air pressure in the second passage (119) when the valve (87) is in its second position and for preventing an increase in air pressure in the second passage (119) when the valve (87) is in its first position; and*

*means (83) located at the outlet of the second passage (119) for reducing the service air pressure, communicated by the brake service air source (14) to the main outlet (79) through the main flow passage (85), in response to an increase in air pressure in the second passage (119), which develops when the valve (87) is in its second position.*

*40. A brake service air module as in claim 39 wherein the outlet of the second passage (119) is located between the valve (87) and the main inlet (76).*

*41. A brake service air module as in claim 39 wherein the means (83) for reducing the service air pressure communicated to the main outlet (79) comprises:*

*a chamber (116) connected to the outlet of the second passage (119); an outlet of the chamber (116) being located along the main flow passage (85); and*

*a diaphragm (115) connected to the outlet of the chamber (116) along the main flow passage (85); the diaphragm being adapted to move outwardly of the outlet of the chamber (116) in response to an increase in biassing air pressure in the chamber (116), which develops when there is an increase in air pressure in the second passage (119).*

*42. A brake service air module as in claim 39 wherein the means (83) for reducing the service air pressure communicated to the main outlet (79) comprises:*

*a chamber (116) connected to the outlet of the second passage (119); an outlet of the chamber (116) being located along the main flow passage (85); and*

*a piston (120) located within the chamber (116), between the outlet of the second passage (119) and the outlet of the chamber (116), along the main flow passage (85); the piston (120) being adapted to move outwardly of the outlet of the chamber (116) in response to an increase in biassing air pressure in the chamber (116), which develops when there is an increase in air pressure in the second passage (119).*

*43. A brake service air module as in claim 42 wherein:*

*the outlet of the chamber (116), located along the main flow passage (85), is opposite the outlet of the second passage (119);*

*a diaphragm (115) is connected to the outlet of the chamber (116) along the main flow passage (85); the diaphragm being adapted to move outwardly of the outlet of the chamber (116); and*

*the piston (120), located within the chamber (116), is adapted to bias the diaphragm (115) outwardly of the outlet of the chamber (116) in response to an increase in biassing air pressure in the chamber (116), which develops when there is an increase in air pressure in the second passage (119).*

*44. A brake service air module as in claim 43 wherein the means (83) for reducing the service air pressure communicated to the main outlet (79) comprises: a third valve seat (82) located within the main flow passage (85), between the main inlet (76) and the main outlet (79) and adjacent the diaphragm (115), and wherein the diaphragm (115) is adapted to move towards the third valve seat (82) and to restrict the opening of the third valve seat (82) when the piston (120) biasses the diaphragm (115) outwardly of the outlet of the chamber (116) in response to an increase in biassing air pressure in the chamber (116).*

*45. A brake service air module as in claim 44 wherein the means (83) for reducing the service air pressure communicated to the main outlet (79) comprises: a floating spool, diaphragm actuable, valve comprising a stem (114), positioned within the main flow passage (85) and connected at its ends to a pair of diaphragms (115 and 115a); the diaphragms (115 and 115a) being disposed on opposite sides of the main flow passage (85) and being movable relative to the sides of the main flow passage (85); a first of the diaphragms (115) being connected to the outlet of the chamber (116) and being located on one side of the third valve seat (82); a second of the diaphragms (115a) being located on the opposite side of the third valve seat (82) from the first diaphragm (115); and the two diaphragms (115 and 115a) and the stem (114) being adapted to move in the same direction when the piston (120) biasses the first diaphragm (115) outwardly of the outlet of the chamber (116) and towards the third valve seat (82).*

*46. A brake service air module as in claim 45 wherein one side of the second diaphragm (115a), opposite to the side thereof which lies along the main flow passage (85), is subjected to atmospheric pressure.*

*47. A brake service air module as in claim 46 which includes a quick acting venting valve (127), connected to a first part of the main flow passage (85), between the outlet of the chamber (116) and the valve (87), and to a second part of the main flow passage (85), between the main inlet (76) and the outlet of the chamber (116), whereby a pressure build-up in the first part of the main flow passage (85) can be vented to its second part.*

*48. A brake service air module as in claim 39 wherein the means (111 and 111a) for increasing the air pressure in the second passage (119) comprises means (111 and 111a) for establishing communication between the main inlet (76) and the second passage (119), through the main flow passage (85), when the valve (87) is in its second position and for preventing such communication when the valve (87) is in its first position.*

*49. A brake service air module as in claim 48 wherein the second passage (119) includes an accumulating chamber (122) between the means (83) for reducing the service air pressure communicated to the main outlet (79) and the means (111 and 111a) for establishing communication between the main inlet (76) and the second passage (119).*

*50. A brake service air module as in claim 49 wherein the accumulating chamber (122) includes means (124 and 125) for bleeding air to atmosphere.*

*51. A brake service air module as in claim 48 wherein the means (111 and 111a) for establishing communication between the main inlet (76) and the second passage (119) comprises:*

*a hollow stem (111), slidably extending through the valve (87), between the first and second positions of the valve (87);*

*one end of the hollow stem (111) being in communication with the second passage (119);*

*a port (117) being provided in the hollow stem (111), connecting the exterior and hollow interior of the hollow stem (111);*

*a seat (111a) being carried by the hollow stem (111), that is adapted to engage the valve (87) and that is located, so that communication is established between the main inlet (76) and the exterior of the port (117) when the stem seat (111a) is not engaged by the valve (87) and so that such communication is prevented when the stem seat (111a) is engaged by the valve (87); and*

*means (106) for both moving the valve (87) from its first position to its second position and disengaging the stem seat (111a) from the valve (87) when the valve is in its second position.g*

*52. A brake service air module as in claim 51 wherein the means (106) for both moving the valve (87) and disengaging the stem seat (111a) comprises:*

*a signal passage (105), connected to a source (21) of an air signal and having an outlet adjacent to the first position of the valve (87) and remote from the second position of the valve (87);*

*a diaphragm connected to the outlet of the signal passage (105); the diaphragm being adapted to move away from the outlet of the signal passage (105) and towards the first position of the valve (87) in response to an air signal of the source (21) in the signal passage (105); and*

*means (106) connected to the diaphragm for moving the valve (87) from its first position to its second position in the main flow passage (85) and for moving the hollow stem (111) relative to the valve (87), so that the stem seat (111a) is not engaged by the valve (87), in response to movement of the diaphragm away from the outlet of the signal passage (105) and towards the first position of the valve (87).*

*53. A brake service air module as in claim 52 wherein the valve (87) is disposed in an enlarged portion (90) of the main flow passage (85) and wherein the valve (87) is movable between a pair of opposed, first and second, valve seats (107 and 86), within the enlarged portion (90) of the main flow passage (85); the first valve seat (107) being downstream of the valve (87), so that when the valve (87) is in its first position, the valve is seated against the first valve seat (107) and communication between the main inlet (76) and main outlet (79) along the main flow passage (85) is established; and the second valve seat (86) being upstream of the valve (87), so that when the valve (87) is in its second posi-*

*tion, the valve is seated against the second valve seat (86) and communication between the main inlet (76) and the main outlet (79) along the main flow passage (85) is prevented by the valve (87).*

*54. A brake service air module as in claim 53 wherein the hollow stem (111) extends through the first and second, valve seats (107 and 86).*

*55. A brake service air module as in claim 52 wherein the means (106) connected to the diaphragm for moving the valve (87) and the hollow stem (111) includes:*

*a pilot piston (106) connected to and extending through the diaphragm and positioned between the first position of the valve (87) and the outlet of the signal passage (105);*

*a second chamber (132) between the outlet of the signal passage (105) and the first position of the valve (87);*

*the pilot piston (106) being provided within the second chamber (132) and being adapted to move within the second chamber (132) towards the first position of the valve (87) and away from the outlet of the signal passage (105) in response to movement of the diaphragm away from the outlet of the signal passage (105) and towards the first position of the valve (87); the pilot piston (106) also being provided with a bleed hole (129) connecting the second chamber (132) with the outlet of the signal passage (105); and*

*means connected to the pilot piston (106) for moving the valve (87) from its first position to its second position in the main flow passage (85) and for moving the hollow stem (111) relative to the valve (87), so that the stem seat (111a) is not engaged by the valve (87), in response to movement of the pilot piston (106) within the second chamber (132) away from the outlet of the signal passage (105) and towards the first position of the valve (87).*

*56. A brake service air module as in claim 51 wherein the valve (87) is between the stem seat (111a) and the first position of the valve (87) and wherein the means (106) for both moving the valve (87) and disengaging the stem seat (111a) is adapted to move the hollow stem (111) towards the second position of the valve (87).*

*57. A brake service air module as in claim 56 which includes means (108), located adjacent the second position of the valve (87), for biassing the valve (87) towards its first position and away from its second position.*

*58. A brake service air module as in claim 57 wherein the means (108) for biassing the valve (87) towards its first position and away from its second position comprises a spring means (108), located adjacent the one end of the hollow stem (111) in communication with the second passage (119), for biassing the hollow stem (111) towards the first position of the valve (87) and biassing the stem seat (111a) into engagement with the valve (87).*

*59. A brake service air module as in claim 51 wherein the means for both moving the valve (87) and disengaging the stem seat (111a) comprises:*

*a pilot piston (106) that is: adjacent the first position of the valve (87); remote from the second position of the valve (87); adjacent the other end of the hollow stem (111), which is opposite the one end of the hollow stem (111) in communication with the second passage (119); separated from the stem seat (111a) by the valve (87); and adapted to move towards the first position of the valve (87);*

*means for moving the pilot piston (106) towards the first position of the valve (87); and*

*means, connected to the pilot piston (106) and extending towards the valve (87) and its second position, that is adapted to move to a position between the first and second positions of the valve (87) and in doing so: (1) to contact initially the adjacent other end of the hollow stem (111) and urge the hollow stem (111) to slide through the valve (87) and towards the second position of the valve (87) and (2) to contact subsequently the valve (87) and urge the valve (87) towards its second position in response to movement of the pilot piston (106) towards the first position of the valve (87).*

*60. A brake service air module as in claim 59 wherein the means (106) for moving the pilot piston (106) comprises:*

*a signal passage (105), connected to a source (21) of an air signal and having an outlet adjacent to the first position of the valve (87) and remote from the second position of the valve (87); and*

*a diaphragm connected to the outlet of the signal passage (105); the diaphragm being adapted to move away from the outlet of the signal passage (105) and towards the first position of the valve (87) in response to an air signal of the source (21) in the signal passage (105); and*

*the pilot piston (106) being connected to the diaphragm and adapted to move towards the first position of the valve (87) in response to movement of the diaphragm away from the outlet of the signal passage (105) and towards the first position of the valve (87).*

*61. A brake service air module as in claim 59 which includes means (108) for biassing the valve (87) towards its first position and away from its second position, comprising a spring means (108), located adjacent the second position of the valve (87) and adjacent the one end of the hollow stem (111) in communication with the second passage (119), for biassing the hollow stem (111) towards the first position of the valve (87) and for biassing the stem seat (111a) into engagement with the valve (87).*

*62. A brake service air module as in claim 51 which includes a vent passage (109), one end of which is connected to the main flow passage (85), downstream of the first position of the valve (87), so that when the valve (87) is in its first position, communication between the vent passage (109) and the second passage (119) is established through the port (117) of the hollow stem (111).*

*63. A brake service air module as in claim 62 wherein, when the valve (87) is in its first position, communicating between the vent passage (109) and the main inlet (76) and the main outlet (79) is prevented by the valve (87) and, when the valve (87) is in its second position, communication between the vent passage (109) and the main outlet (79) is established but communication between the main inlet (76) and the vent passage (109) is prevented by the valve (87).*

*64. A brake service air module as in claim 39 wherein the second passage (119) includes an accumulating chamber (122) between the means (83) for reducing the service air pressure communicated to the main outlet (79) and the means (111 and 111a) for increasing the air pressure in the second passage (119).*

*65. A brake service air module as in claim 64 wherein the second passage (119) includes means (121) for bleeding air to the accumulating chamber (122).*

*66. A brake service air module as in claim 65 wherein the accumulating chamber (122) includes means (124 and 125) for bleeding air to atmosphere.*

*67. A brake service air module as in claim 64 wherein the accumulating chamber (122) includes means (124 and 125) for bleeding air to atmosphere.*

* * * * *

UNITED STATES PATENT AND TRADEMARK OFFICE

CERTIFICATE OF CORRECTION

PATENT NO. : Re. 30,177

DATED : December 25, 1979

INVENTOR(S) : Morse et al

It is certified that error appears in the above-identified patent and that said Letters Patent are hereby corrected as shown below:

at column 8, line 33, "acton" should be -- action -- ;

at column 11, line 40, "85" should be -- (85) -- ; and at column 18, line 35, after "position.", should be deleted -- g -- .

Signed and Sealed this

*First* Day of *July 1980*

[SEAL]

*Attest:*

SIDNEY A. DIAMOND

*Attesting Officer*

*Commissioner of Patents and Trademarks*